United States Patent [19]

Rutan et al.

[11] Patent Number: 4,561,559

[45] Date of Patent: Dec. 31, 1985

[54] FUEL TANK VENTING VALVE

[75] Inventors: Fred E. Rutan; Mark A. Chmelar, both of Dubuque, Iowa

[73] Assignee: Deere & Company, Moline, Ill.

[21] Appl. No.: 669,161

[22] Filed: Nov. 7, 1984

[51] Int. Cl.[4] ............................................. F16K 17/04
[52] U.S. Cl. .................................. 220/203; 137/493.5
[58] Field of Search ............... 137/493.3, 493.4, 493.5; 220/203, DIG. 32, DIG. 33

[56] References Cited

U.S. PATENT DOCUMENTS 1,153,770  9/1915  Daymon ...................... 137/493.5 X
3,939,866  2/1976  Pignatelli ..................... 137/493.5 X
3,971,406  7/1976  Inada et al. ...................... 137/493.4

FOREIGN PATENT DOCUMENTS 37793  12/1886  Fed. Rep. of Germany ... 137/493.4
153513 11/1920  United Kingdom ............. 137/493.5

Primary Examiner—Steven M. Pollard

[57] ABSTRACT

A fuel tank venting valve includes a housing defining a cylindrical chamber having a first plunger slidably mounted therein, and a spring biasing the first plunger in a closed position. The first plunger itself defining a cylindrical chamber having a second plunger slidably mounted therein, and a spring biasing the second plunger in a closed position opposite to the closed position of the first plunger.

1 Claim, 2 Drawing Figures

FUEL TANK VENTING VALVE

BACKGROUND OF THE INVENTION

This invention relates to vehicle fuel tank venting means.

The fuel delivery system of a vehicle requires venting of a constituent fuel tank. The fuel tank must be vented to maintain atmospheric pressure within the tank to faciliate proper fuel flow through the system. The fuel tank pressure may exceed atmospheric pressure due to heat expansion of the contained fuel. During vehicle operation, the fuel tank pressure may fall below atmospheric pressure due to fuel withdrawal from the tank for delivery to the vehicle's prime mover.

It is customary to vent a fuel tank to the atmosphere to maintain atmospheric pressure within the tank. However, the fuel tank vent provides an avenue for fuel escape which is most probable to occur with respect to off-road vehicles operated on side sloping terrain.

SUMMARY OF THE INVENTION

It is an objective of the present invention to provide a means of venting a vehicle fuel tank which does not facilitate fuel escape. More specifically, it is an objective of the present invention to disclose a two-way valve means located within a vent hose of a fuel tank which is pressure differentiating.

A pressure differentiating, two-way valve is press fitted in the vent hose leading from the fuel tank filler neck. The valve is comprised of a cylindrical housing open at both ends to define a contained cylindrical chamber. Mounted within the chamber is a first plunger which itself houses a second plunger. A first contained spring acts on the first plunger and a second contained spring acts on the second plunger opposite to the action of the spring spring.

The first and second springs have a generally equal and opposite action on the plungers such that should the fuel tank experience a pressure drop, the first plunger opens to vent and fuel tank to atmosphere. Should the fuel tank experience a pressure increase, the second plunger opens vent fuel tank to the atmosphere. Under normal conditions, the valve is closed.

DESCRIPTION OF THE PREFERRED EMBODIMENT

Figure 1:
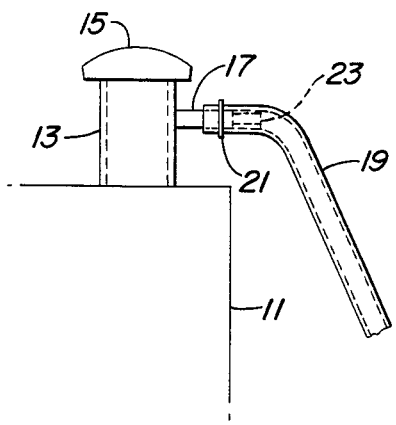
FIG. 1 is a partial elevated side view of a vehicle fuel tank having a fuel tank venting valve in accordance with the present invention located in the vent hose.

Referring to FIG. 1, the present invention is most beneficial for use in the fuel delivery system of an off-road vehicle (not shown). A conventional fuel tank 11 is associated with the vehicle fuel delivery system. A filler neck 13 is fixably mounted to the fuel tank 11 in a conventional manner at one end to permit fuel to be deposited in the fuel tank 11. The other end of the filler neck 13 is selectively closed by a tank cap 15 which is fixably and detachably mounted in a conventional manner.

In order to vent the fuel tank 11, a vent tube 17 is fixably mounted to the filler neck at one end by any conventional means. One end of a vent hose 19 is fixably mounted to the other end of the vent tube 17 by any conventional means such as by a clamp 21. Press mounted within the vent hose 19 in close proximity to vent tube 17 is a pressure differentiating two-way valve 23.

Figure 2:
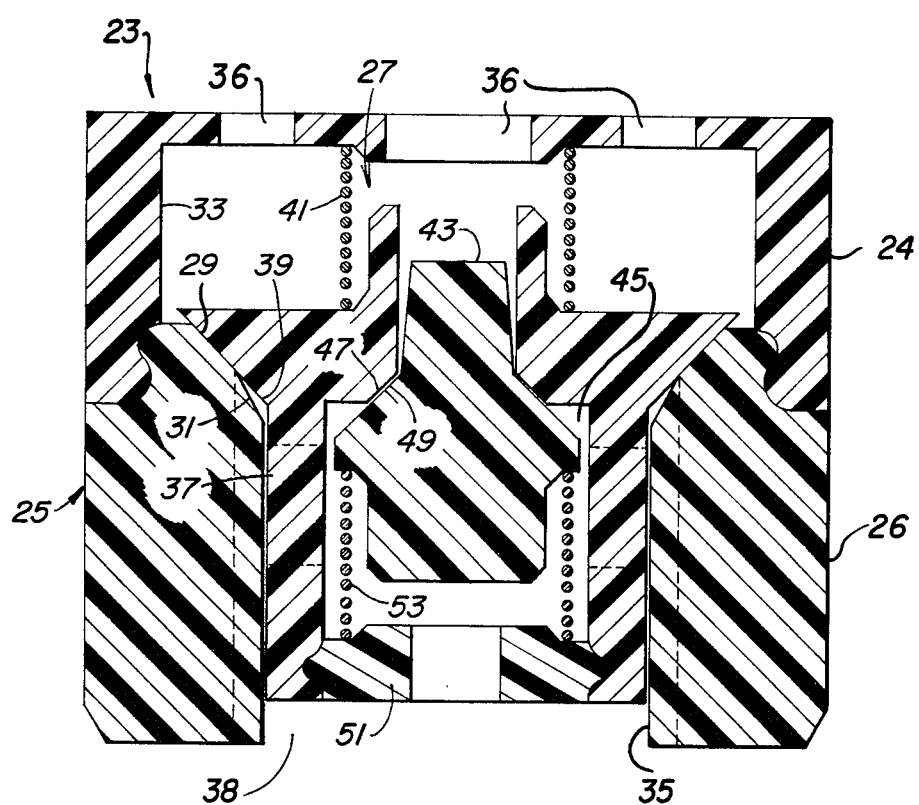
FIG. 2 is a sectioned view of the venting valve.

Referring to FIG. 2, the pressure differentiating two-way valve 23 is comprised of a generally cylindrically shaped housing 25 mattingly sized to the vent tube 19. The housing 23 is comprised of two sections, 24 and 26, which in the preferred embodiment are composed of elastomeric material and can be snap mounted to define a generally cylindrically shaped chamber 27 having contiguous bevel landings 29 and 31. The chamber 27 has a forward chamber section 33 and rearward chamber section 35. A plurality of end apertures 36 provide access to chamber section 33. A first plunger 37 is slidably mounted longitudinally in the second chamber 35 aligned to chamber 35 opening 38. The forward section of the plunger 37 has a bevel surface 39 in major portion mating to bevel landing 29. A spring 41 located in the first chamber 33 biases the plunger 37 rearwardly against bevel landing 29.

A second plunger 43 is slidably mounted in a generally cylindrical open ended chamber 45 defined by the first plunger 37. The chamber 45 includes a generally forward located formed bevel landing 47 mating in part to a bevel surface 49 formed around the second plunger 43. A plunger end plate 51 is fixably mounted by any conventional means to and encloses the rearward opening of the plunger 37. The end plate 51 has an aperture 54 to allow communication between chamber 45 and opening 38. A spring 53 is placed in chamber 45 between end plate 51 and plunger 43 to bias plunger 43 forwardly against landing 47.

Under normal operating conditions, the springs 41 and 53 directly biases respective plungers 37 and 43 to block flow through valve 23 and thereby inhibit fuel from escaping through vent tube 19. Should the pressure within fuel tank 11 drop below atmospheric pressure generally due to withdrawal of fuel from the fuel tank, the back pressure created in conjunction with spring 53 overcomes spring 41 to displace plunger 37 and thereby provide pressure compensation to the tank through vent valve 23. Should the fuel pressure exceed atmospheric pressure, the excess pressure will overcoming spring 53 to displace plunger 43 to provide pressure relief through vent valve 19.

We claim:

1. A pressure differentiating two-way vent valve sized for press mounting within a vent hose extending from the filler neck associated with a vehicle's fuel tank, comprising:

a generally cylindrical housing defined by a first section and a second section, said first and second sections being snap mounted together to define a first generally elongated cylindrical chamber, said second section further defining an inwardly directed first beveled landing and a contiguous inwardly directed second beveled landing within said chamber having a bevel angle greater than the bevel angle of said first beveled landing;

said first chamber having a plurality of apertures extending through said housing into said first section's end and a singular aperture extending through said second section's end;

a first elastomer plunger slidably mounted in said chamber in part defined by said second section and having an outwardly directed bevel flange portion form at one end of said first plunger matingly sized to said first bevel landing;

said first elastomer plunger defining a second chamber open at said second chamber's ends extending generally centrally therethrough, said first elastomer plunger further defining an outwardly directed second beveled landing at a point along said second chamber;

a second elastomer plunger slidably mounted in said second chamber, said second elastomer plunger having an outwardly directed bevel flange portion formed at a port therealong mating to and extending slightly beyond said second beveled landing;

an elastomer end plate enclosing one end of said second chamber and having an aperture tgherethrough cocentric to said singular aperture of said second section;

a first spring placed between and biased in compression by aid first section's end and said first plunger flange portion; and a second spring placed between and biased in compression said elastomer end plate and said flange of said second plunger.

* * * * *

UNITED STATES PATENT AND TRADEMARK OFFICE
CERTIFICATE OF CORRECTION

PATENT NO. : 4,561,559
DATED : 31 December 1985
INVENTOR(S) : Fred E. Rutan et al It is certified that error appears in the above-identified patent and that said Letters Patent is hereby corrected as shown below:

Column 4, line 2, delete "tghere-" and insert therefor -- there -- ; same column, line 6, delete "aid" and insert therefor -- said -- ; same column, line 9, after "pression" insert -- by -- .

Signed and Sealed this

Twelfth Day of August 1986

[SEAL]

Attest:

DONALD J. QUIGG

Attesting Officer

Commissioner of Patents and Trademarks